United States Patent Office 3,317,632
Patented May 2, 1967

3,317,632
BLOCK COPOLYESTERS CONTAINING SULFONATE RADICALS
Richard Keith Quisenberry and Edward Anthony Pacofsky, Kinston, N.C., assignors to E. I. du Pont de Nemours and Company, Wilmington, Del., a corporation of Delaware
No Drawing. Filed Mar. 5, 1965, Ser. No. 437,556
5 Claims. (Cl. 260—860)

This invention relates to novel and useful block copolyesters. More specifically it relates to block copolyesters of high molecular weight having particular utility in the form of fiber and film.

U.S. Patent 3,018,272 to Griffing et al. describes the preparation of alkylene terephthalate polymers which have been modified by inclusion of comonomeric constituents containing a sulfonate radical, e.g. a 3,5-dicarboxybenzene sulfonate. While these random polymers have greatly increased affinity for basic type dyes, nevertheless they tend to have relatively poor hydrolytic stability. This property is particularly important in the cellulosic blend area where rather severe caustic finishing conditions are normally encountered.

In accordance with the invention, it has been found that the hydrolytic stability of polymers containing such sulfonate dyesites can be significantly improved by incorporation of the sulfonate constituent as a random component of a sterically hindered block. Significant improvements in hydrolytic stability are achieved with no substantial losses in dyeability, fabric wash performance, and fiber tensile properties.

The novel product of the invention comprises a linear fiber-forming block copolyester, the molecular chains of which consist essentially of recurring alkylene terephthalate blocks and alkylene sulfonate blocks, said alkylene terephthalate blocks having the formula:

$$\{O-X-O-T\}_m \quad (I)$$

wherein
X is lower alkylene,
$m$ is indicative of the molecular weight of the block and is a number of 3 to 200, and
T is

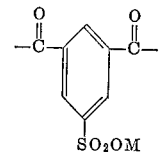

said alkylene sulfonate blocks having the formula:

$$\{O-Y-O-Z\}_n \quad (II)$$

wherein
Y is the radical

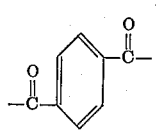

wherein
$q$ is an integer of 1 to 3,
$n$ is indicative of the molecular weight of the block and is a number of 3 to 200, and Z is selected from the group consisting of T and sulfonate radicals of the formula

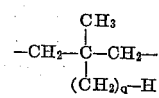

wherein
M is selected from the group consisting of hydrogen and metallic elements, with the proviso that at least 4 mole percent of the said Z radicals in the block be said sulfonate radicals, the proportions of said alkylene terephthalate and alkylene sulfonate blocks in the copolyester being such as to provide therein between about 0.5 and 15 mol percent of said sulfonate radicals and at least 60 percent by weight of said alkylene terephthalate blocks. By "lower alkylene" is meant a saturated, divalent hydrocarbon radical containing from two to about six carbon atoms.

A preferred class of linear fiber-forming block copolyesters according to the invention are those wherein the alkylene terephthalate blocks (I) comprise a polyester of ethylene glycol and terephthalic acid and wherein the alkylene sulfonate blocks (II) comprise a copolyester of 2-methyl-2-ethyl-propanediol-1,3 and a mixture of terephthalic acid with a member of the group consisting of 3,5-dicarbomethoxy benzene sulfonic acid and the metallic salts thereof.

A convenient method for preparing the copolyesters of the invention involves blending together polyesters with structural formulas described in (I) and (II) at a temperature above the melting point of either polyester. The mixture is stirred in an inert atmosphere until a homogeneous melt is obtained, generally about 30 minutes. If the molecular weight of the segmented copolyester is lower than desired, e.g. as the result of employing low molecular weight starting material segments, additional polycondensation can be carried out. The individual polyester blocks may be produced from the appropriate diols with the dimethyl esters of the appropriate aromatic acids in the desired proportion in an ester interchange reaction followed by polycondensation at high temperature and at low partial pressure of the diols, until a polymer of the desired molecular weight is produced. It is advantageous to employ catalysts to accelerate the rate of reaction, and it has been found that manganous acetate, calcium acetate, and sodium methoxide are suitable ester interchange catalysts while antimony trioxide, litharage, and the tetraalkyl titanates such as tetraisopropyl titanates are suitable polycondensation catalysts.

Instead of reacting the diols with dimethyl esters of the acids, other esters of the acids may be used, especially other lower alkyl esters, phenyl esters, or the like. The polyesters may also be prepared by reacting the acid or acids directly with the diol or diols, or with esters of the diols with acetic acid or other lower aliphatic acids. Other equivalent methods may also be employed.

The alkylene terephthalate blocks of Formula I, as described above, are formed of an alkylene glycol and terephthalic acid. Ethylene glycol is the preferred glycol although others such as propylene glycol, butylene glycol, etc. may be used. The alkylene terephthalate blocks are advantageously produced so that on the average there will normally be 3 to 200 recurring units per block.

The alkylene sulfonate blocks are formed of a dialkyl propanediol-1,3 and 3,5 dicarboxybenzene sulfonic acid or its metal salts, e.g. sodium, lithium, etc. Preferably terephthalic acid, as described above, will be included as a comonomeric substituent of this block and will account for at least 50 mol percent of the acids therein. The alkylene sulfonate block should have on the average about 3 to 200 repeating units per block.

The expression "polymer melt temperature" employed with respect to the products of this invention is the minimum temperature at which a sample of the polymer leaves a wet molten trail as it is stroked with moderate pressure across a smooth surface of a heated metal. "Polymer melt temperature" has sometimes in the past been referred to as "polymer stick temperature."

The term "intrinsic viscosity," as used herein, is defined as the limit of the fraction $\ln(r)/c$, as $c$ approaches 0, where $(r)$ is the relative viscosity, and $c$ is the concentration in grams per 100 ml. of solution. The relative viscosity $(r)$ is the ratio of the viscosity of a solution of the polymer in a mixture of 1 part trifluoroacetic acid and 3 parts methylene chloride (by volume) to the viscosity of the trifluoroacetic acid/methylene chloride mixture, per se, measured in the same units at 25° C. Inherent viscosity values reported are measured at 0.25% (by weight) concentration in a 75:25 (by volume) mixture of methylene chloride: trifluoroacetic acid at 25° C. Intrinsic, relative, and inherent viscosity each are a measure of the degree of polymerization.

The test for alkaline sensitivity given in Examples 1–4 is carried out by boiling one part of the test fibers in 1,000 parts of a 1% aqueous solution of sodium hydroxide for 1 hour. The results given are based on assigning an arbitrary value of unity to the fractional weight lost by the control sample. As will be apparent from the comparative data, the polymers of the invention have a level of alkaline sensitivity comparable to that of polyethylene terephthalate and quite superior to that of a random copolymer containing aromatic sulfonate radicals as above described.

This invention is further illustrated, but is not intended to be limited, by the following examples in which parts and percentages are by weight, unless otherwise specified.

To facilitate explanation in the remaining disclosure, the following and analogous abbreviations will be employed:

T—Terephthalic acid
DMT—Dimethylterephthalate
2G—Ethylene glycol
2G–T—Polyester of ethylene glycol and terephthalic acid
MeEt3G—2-methyl-2-ethyl-propanediol-1,3
2Me3G—2,2-dimethyl-propanediol-1,3
MeP3G—2-methyl-2-propyl-propanediol-1,3
NaD—Sodium-3,5-dicarboxylatebenzene sulfonate
MeEt3G–T—Polyester of MeEt3G and terephthalic acid
MeEt3G–T/NaD (.88/.12) — Random copolymer of MeEt3G, terephthalic acid and NaD,T/NaD ratio= 88/12 mol percent
2G–T//MeEt3G–T/NaD (.88/.12)(5//1)—A block copolymer prepared by melt blending 5 parts by weight 2G–T block with 1 part by weight MeEt3G–T/NaD block (.88/.12 mol percent of respective acids). Overall NaD content=1.5 mol percent
2G–T/NaD (.98/.2)—Random copolymer containing 2 mol percent NaD (control)

EXAMPLES 1–3

*Block copolyester of 2G–T//MeEt3G–T/NaD (.88/.12) (83//17)*

2G–T block.—A 2G–T polyester is prepared in the normal manner by reacting 8 parts DMT and 5.2 parts ethylene glycol in the presence of 0.0025 part of $Sb_2O_3$ and 0.0037 part manganous acetate-tetrahydrate as a catalyst. The polymerization is conducted in an autoclave at a temperature of up to 230° C. under a nitrogen sweep, atmospheric pressure, for 2.5 to 3 hours. Polymerization is completed by heating at a temperature of 280° C. for 2.5 to 3.5 hours at about 1 mm. Hg. The product is a clear melt which cools to an opaque white solid and has an intrinsic viscosity of 0.6 to 0.7.

MeEt3G–T/NaD block.—This hindered block is prepared from a charge of

| | Parts |
|---|---|
| DMT | 7.06 |
| DMNaD | 1.46 |
| MeEt3G | 11.19 |
| Tetrabutyltitanate (as an n-butanol solution) | .0073 |

The polymerization is conducted in an autoclave at a temperature of up to 230° C. under a nitrogen sweep, atmospheric pressure, for 2.5 to 3.5 hours. Polymerization is completed by heating at a temperature of 240° C. for 3 to 4 hours at about 1 mm. Hg. The product is a clear melt which cools to an opaque white solid and has an intrinsic viscosity of 0.3 to 0.4. The polymer is cast and cut to flake.

One part by weight of finely cut and dried MeEt3G–T/NaD (.88/.12) flake is added to 5 parts by weight of molten 2G–T and the mixture stirred for 45 minutes at 280° C. under a nitrogen blanket. The block copolymer thus formed is cast and cut in the usual manner. The flake is thoroughly dried at a temperature of 200° C. under a flow of hot inert gas. For producing filaments the polymer is fed to a screw melter hopper and spun and drawn on conventional equipment. The copolyester formation is repeated to vary the percentages, as indicated in Table I, of the respective blocks in the copolyester.

Fibers were melt spun from polymers of the invention, drawn in length over a heated metal surface, subjected to a finishing operation and various properties measured thereon. A control sample, similarly prepared, was a random copolymer of ethylene glycol with a mixture of terephthalic acid and 3,5-dicarboxybenzene sulfonate prepared in accordance with the aforementioned Griffing et al. patent. Data obtained from fibers of the invention versus those of the control are as follows:

TABLE I

| | 2G–T/NaD (98/2) Random Copolymer (Control) | 2G–T/MeEt3G–T/NaD (.88/.12) Block Copolymer | | |
|---|---|---|---|---|
| | | (83//17) | (86.5//13.5) | (89//11) |
| Mol percent NaD Overall | 2.0 | 1.5 | 1.25 | 1.0 |
| Polymer melt temperature, ° C | 252 | 245 | 238 | 245 |
| Intrinsic Viscosity (Polymer) | 0.5 | 0.790 | 0.670 | 1.08 |
| Spinning Temp., ° C | 296 | 285 | 290 | 285 |
| Draw Ratio | 3 | 4.03 | 3.76 | 3.26 |
| Draw (Heated Metal Surface) Temp., ° C | 110 | 145 | 140 | 130 |
| T/E/Mi | 3/23/88 | 4/22/99 | 4/22/97 | 4/24/100 |
| Caustic Sensitivity (Relative to Control) | 1.0 | 0.4 | 0.3 | 0.2 |

EXAMPLE 4

The procedure of Example 1 is repeated with variations in the molecular weight of the 2G–T block size in order to produce a series of block copolyesters of 2G–T//MeEt3G–T/NaD (.88/.12) (83//17). The polymerization of MeEt3G–T/NaD is carried out as described in Example 1. The polymerization of 2G–T is carried out also as previously described except for the use of varying polymerization periods so as to regulate the molecular weight. Thus 2G–T blocks are prepared having relative viscosities of 48, 37, 26, 24, 17 and 15. Constant blending conditions for forming the copolyester are used comprising 45 minutes at 280° C. followed by drying for 3 hours.

Spinning of the various polymers in accordance with Example 1 yields yarns similar in properties to that produced therein containing 1.5 mol percent NaD over-all. The variations in initial 2G-T block size has little or no effect upon the yarn properties. All of the block copolyesters have a caustic sensitivity, relative to the control, of 0.4–0.5.

EXAMPLE 5

Upon the procedure of Example 1, the following block copolymer is formed:

2G-T//MeEt3G-T/NaD (.9/.1) (80//20)

Before combining to form the copolyester, the 2G-T block has an inherent viscosity of 0.73 whereas that of the hindered block has an inherent viscosity of 0.21. The copolymerization of the two blocks is effected at a temperature of 280° C. for 18 minutes, to produce a polymer having an inherent viscosity of 0.34 and a polymer melt temperature of 248° C. Films of the block copolyester are cast into film and compared against other polyesters for stability against hydrolysis by boiling in aqueous NaOH solution for 1 hour. The following data is obtained.

TABLE II.—WEIGHT LOSS OF POLYESTERS AFTER TREATMENT IN NaOH AT THE BOIL FOR 1 HOUR

[Measured on Film]

| Polymer | Composition | Wt. Loss, 1% NaOH | Wt. Loss, 2% NaOH |
|---|---|---|---|
| 1 | 2G-T | 0.65 | 6.87 |
| 2 | 2G-T/NaD (.98/.02) | 3.40 | 32.78 |
| 3 | 2G-T//MeEt3G-T (80/20) | 0.31 | 3.03 |
| 4 | 2G-T/NaD (.975/.025)//MeET3G-T (80/20) | 1.21 | 11.39 |
| 5 | 2G-T//MeEt3G-T/NaD (.9/.1) (80//20) | 0.40 | 4.83 |

EXAMPLE 6

Using the procedure of Example 1 but replacing MeEt3G with 2Me3G and MeP3G, the following block copolymers are formed:

2G-T//2Me3G-T/NaD (.88/.12) (83//17)
2G-T//MeP3G-T/NaD (.92/.08) (75//25)

The intrinsic viscosity and polymer melt temperature for the two copolymers are 0.39 and 248° C., and 0.47 and 231° C., respectively. Both are fiber-forming and exhibit reduced caustic sensitivity.

As pointed out previously, the polymers of the present invention are substantially less sensitive to caustic as compared to random copolymers of corresponding composition. Infrared spectra and differential thermal analysis indicate features of both polymer moieties in the segmented polymer.

Many equivalent modifications of the above described invention will be apparent to those skilled in the art without a departure from the inventive concept.

What is claimed:
1. A linear fiber-forming block copolyester, the molecular chains of which consist essentially of recurring alkylene terephthalate blocks and alkylene sulfonate blocks, said alkylene terephthalate blocks having the formula:

$$\text{+O—X—O—T+}_m \quad (I)$$

wherein
X is lower alkylene,
m is indicative of the molecular weight of the block and is a number of 3 to 200, and
T is

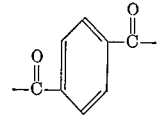

said alkylene sulfonate blocks having the formula:

$$\text{+O—Y—O—Z+}_n \quad (II)$$

wherein
Y is the radical

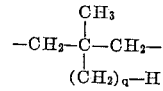

wherein
q is an integer of 1 to 3,
n is indicative of the molecular weight of the block and is a number of 3 to 200, and
Z is selected from the group consisting of T and sulfonate radicals of the formula

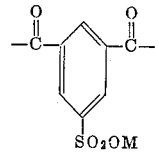

wherein M is selected from the group consisting of hydrogen and metallic elements,
with the proviso that at least 4 mol percent of the said Z radicals in the block be said sulfonate radicals,
the proportions of said alkylene terephthalate and alkylene sulfonate blocks in the copolyester being such as to provide therein between about 0.5 and 15 mol percent of said sulfonate radicals and at least 60 percent by weight of said alkylene terephthalate blocks.

2. A linear fiber-forming block copolyester, according to claim 1 wherein M is sodium.

3. A linear fiber-forming block copolyester according to claim 1 wherein the alkylene terephthalate blocks (I) comprise a polyester of ethylene glycol and terephthalic acid and wherein the alkylene sulfonate blocks (II) comprise a polyester of 2-methyl-2-ethyl-propanediol 1,3 and a mixture of terephthalic acid with a member of the group consisting of 3,5-dicarbomethoxy benzene sulfonic acid and the metallic salts thereof.

4. A linear fiber-forming block copolyester according to claim 3 composed of 83 percent by weight of blocks (I) and 17 percent by weight of blocks (II), the said mixture of the two said acids comprising blocks (II) being 88 mol percent and 12 mol percent, respectively.

5. A linear fiber-forming block copolyester according to claim 3 composed of 80 percent by weight of block (I) and 20 percent by weight of blocks (II), the said mixture of the two said acids comprising blocks (II) being 90 mol percent and 10 mol percent, respectively.

References Cited by the Examiner

UNITED STATES PATENTS 3,018,272  1/1962  Griffing et al. _____ 260—75
3,042,650  7/1962  Bockstahler _____ 260—861

FOREIGN PATENTS 1,303,888  8/1962  France.

MURRAY TILLMAN, *Primary Examiner.*
SAMUEL H. BLECH, J. T. GOOLKASIAN,
*Assistant Examiners.*